Figure 5:
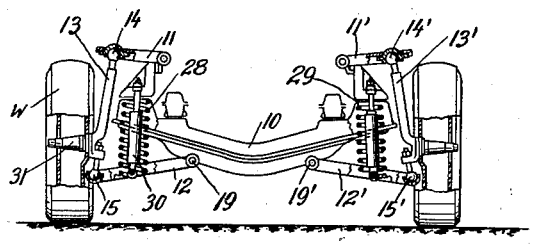

Jan. 17, 1961     F. K. H. NALLINGER     2,968,492
PIVOTAL LINK WHEEL SUSPENSION FOR MOTOR VEHICLES
Filed March 11, 1958     2 Sheets-Sheet 1
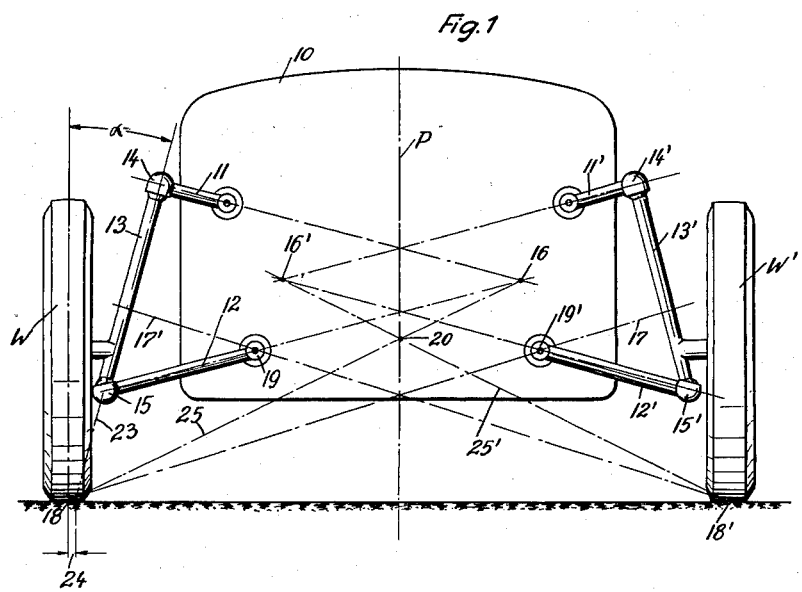
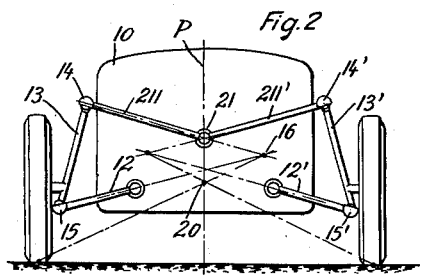
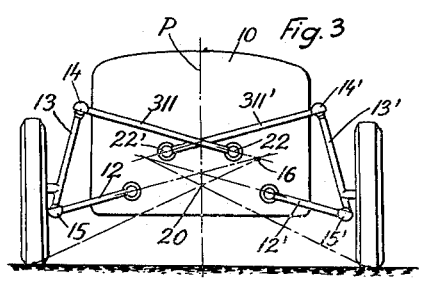
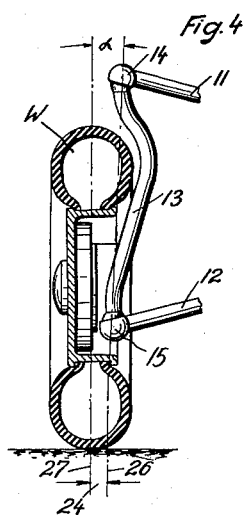
Inventor
FRIEDRICH K. H. NALLINGER
BY Dicke and Craig
ATTORNEYS United States Patent Office 2,968,492
Patented Jan. 17, 1961

2,968,492

PIVOTAL LINK WHEEL SUSPENSION FOR MOTOR VEHICLES

Friedrich K. H. Nallinger, Stuttgart, Germany, assignor to Daimler-Benz Aktiengesellschaft, Stuttgart-Unterturkheim, Germany Filed Mar. 11, 1958, Ser. No. 720,670

Claims priority, application Germany Mar. 15, 1957

7 Claims. (Cl. 280—124)

My invention relates to a wheel-suspension for motor vehicles of the type having a pair of superimposed links extending generally transversely of the vehicle.

The objects of my invention are:

To provide an improved wheel-suspension of this type in which the momentaneous center of the springing movement of the wheels relative to the frame is located at a particularly high level to thereby improve the riding qualities of the car reducing the tendency of inclination in curves;

To so improve the suspension of the steerable front wheels of a motor vehicle as to reduce the tendency of the vehicle of oversteering in curves;

To improve the kinematic conditions during the springing movement of the wheel axis relative to the frame;

To increase the space available between the upper and lower transverse links for the accommodation of frame elements, springs, shock absorbers and the like;

To reduce the forces required to transfer the braking couple between the frame and the wheel; and To reduce the angle between the axis of the pivotal steering movement and the central plane of the wheel and to reduce the distance of such plane from the point of intersection of said axis with the ground to thereby reduce the steering forces.

Further objects of my invention will appear from a detailed description of a number of preferred embodiments thereof following hereinafter with reference to the accompanying drawings. It is to be understood, however, that my invention is in no way limited to the details of such embodiments but is capable of numerous modifications within the scope of the appended claims and that the terms and phrases used in such detailed description have been chosen for the purpose of illustrating the invention rather than that of restricting or limiting same.

In the drawings

Fig. 1 is a diagrammatic front view of a motor vehicle equipped with my improved wheel-suspension, Fig. 2 is a view similar to that of Fig. 1 of a modified suspension in which the length of the upper links is increased, Fig. 3 is a front view of still another embodiment in which the length of the upper links is even further increased, Fig. 4 is a partial transverse section of a wheel illustrating part of the suspending means associated therewith and Fig. 5 is a front view of a motor vehicle chassis equipped with my novel wheel-suspension.

In Fig. 1 I have illustrated the body or frame 10 of a motor vehicle, a pair of opposite wheels equipped with tires W and W' and two sets of wheel-suspending means, one for each wheel. These sets are symmetrical with respect to the central vertical long'tud'nal p'ane P so that it will suffice to describe one of these sets hereinafter. The elements of the other set are designated by similar but primed reference numerals.

The set of wheel-suspending means shown at the left of Fig. 1 comprises a wheel carrier 13 preferably formed by an upwardly and inwardly inclined rod substantially located in a transverse plane of the vehicle and a pair of superimposed links 11 and 12 extending transversely of the vehicle. Each of the two links 11, 12 has its outer end pivotally connected to the wheel carrier 13, preferably by means of ball joint 14, or 15 respectively, whereas the inner end of each link is pivotally connected to the frame 10, preferably for oscillation about axes extending generally fore and aft, one of such axes being designated 19. Since such means for pivotally connecting the links to the frame for oscillation are well-known, they need not be described in detail. The lower link 12 is of greater length than the upper link 11 and has substantially wishbone shape.

The outer end of the upper link 11 having the ball joint 14 is disposed closely above or at the level, but not substantially below the level, of the top of the tire W of the wheel.

Owing to the provision of the ball joints 14 and 15, the wheel carrier 13 is capable of a pivotal steering motion about the axis 23 extending through the centers of the ball joints 14 and 15 under the control of suitable conventional steering means not shown. The axial lines of the links 11 and 12 extending through the ends of these links in a transverse plane of the vehicle intersect at point 16. It is a material feature of my invention that this point 16 is disposed above a straight line 17 extending through the place 18 of contact of the tire W of the wheel with the ground and through the inner end 19' of the lower one of the pair of links 11', 12' forming part of the set of wheel-suspending means associated with the other wheel W'.

It is a well-known principle of kinematics that the momentaneous center of the pivotal springing movement of the wheel W relative to the frame or body 10 is located on the point of intersection 20 of the lines 25, 25' each of which extends from the place 18 of contact of the wheel with the ground to the point 16 mentioned hereinabove. Hence, it will appear, that this center 20 is disposed at a particularly high level, whereby the tendency of the vehicle to incline outwardly in curves will be considerably reduced.

In this connection emphasis must be placed on the fact that the inner ends of the two links 11 and 12 are spaced a shorter distance apart than their outer ends, whereby the links will converge inwardly.

The exact location of the points 16, 16' is not invariable, but depends to a certain degree upon the load causing the springs omitted in Figs. 1 to 4 for sake of clarity to be more or less compressed. In Fig. 1 the wheel-suspension is shown for a medium load of the vehicle.

The wheel-suspension shown in Fig. 2 differs from that shown in Fig. 1 primarily by the length of the upper links 211 and 211' which are substantially longer than the links 11 and 11' and have their inner ends 21 disposed at a common location in the vertical central longitudinal plane P of the vehicle.

In the wheel-suspension illustrated in Fig. 3 the length of the upper links 311 and 311' is increased to such an extent that the ends of each link 311 or 311' are disposed on opposite sides of the vertical central longitudinal plane P. Thus, the outer end 14 of link 311 is disposed on the left of plane P whereas the inner end 22 of link 311 is disposed on the right of the plane P.

Hence, it will appear that, depending on the kinematic conditions, the length of the upper links may vary between wide limits. By electing an arrangement in which the inner ends of the upper links are located beyond the central plane P as shown in Fig. 3, the upper end 14 of the wheel carrier 13 will be nearly guided along a straight line. In cases where the crossing of the upper links 311 and 311' is undesirable, the arrangement of Fig. 2 may be preferred in which the inner ends of the links 211 and 211' have a common location. However, the reduced lengths of the upper links shown in Fig. 1 likewise permits to obtain satisfactory results.

In Fig. 4 I have shown an embodiment of my invention in which a straight line 26 connecting the outer ends of the superimposed links 11 and 12 will extend through the tire W of the wheel. For this reason the wheel carrier 13 is curved around the tire W. As a result, the pivotal steering axis 26 extending through the outer ends of the links 11 and 12 provided with the ball joints 14 and 15 will form a very small angle α with the central plane 27 of the wheel W and the distance 24 of such plane from the point of intersection of the pivotal axis 26 with the ground will be a minimum. This is highly desirable in order to reduce the steering forces, i.e. the physical effort required to turn the steering wheel of the vehicle and to reduce the reaction of the road upon the steering wheel.

In the embodiments illustrated in Figs. 1, 2, 3, and 5 the pivotal steering axis 23 is more inclined than the pivotal steering axis 26 in Fig. 4 resulting in a larger angle α. On the other hand, this large angle α results in a particularly short distance 24.

As the wheel carrier 13 has a considerable length, it is preferably made of light metal in order to reduce the total weight of the unsprung element.

In Fig. 5 I have illustrated a preferred mounting of the springs associated with a wheel-suspension of the type shown in Fig. 1.

Preferably, helical springs 28 are disposed in substantially upright position above the lower wishbone links 12, 12' and are braced thereagainst. The frame 10 is formed with spring supports 29 which rest on the upper ends of the springs 28 and are disposed below the upper links 11, 11'. Inside of the helical springs shock absorbers 30 of the telescope type may be mounted having one end pivotally connected to the lower wishbone links whereas the upper ends are secured to the spring supports 29.

Each wheel W is journaled on an outwardly extending trunnion 31 with which the rod 13 is formed and is confined to the space below the level of the upper end 14 of the rod 13.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a vehicle, the combination comprising a frame, a pair of opposite wheels having tires, and two sets of wheel-suspending means one for each wheel, each set comprising a wheel carrier for one of said wheels, a pair of superimposed links extending transversely of the vehicle, each link having its outer end pivotally connected to said wheel carrier and its inner end pivotally connected to said frame, the outer end of the upper one of said links being disposed at a level at least as high as the highest point of the tire of said one of said wheels, the axial lines of said links extending through said ends in a transverse plane of said vehicle intersecting at a point disposed above a straight line extending through the place of contact of said lastmentioned one of said wheels with the ground and through the inner end of the lower one of the pair of links forming part of said set associated with the other one of said wheels and a helical spring disposed in substantially upright position above and braced against said lower link, said frame being formed with spring supports resting on the upper ends of said springs and disposed below the upper ones of said links.

2. In a vehicle, the combination comprising a frame, a pair of opposite wheels having tires, two sets of wheel-suspending means one for each wheel, each set comprising a wheel carrier for one of said wheels, a pair of superimposed links extending transversely of the vehicle, each link having its outer end pivotally connected to said wheel carrier and its inner end pivotally connected to said frame, the outer end of the upper one of said links being disposed at a level at least as high as the highest point of the tire of said one of said wheels, the axial lines of said links extending through said ends in a transverse plane of said vehicle intersecting at a point disposed above a straight line extending through the place of contact of said last-mentioned one of said wheels with the ground and through the inner end of the lower one of the pair of links forming part of said set associated with the other one of said wheels, the ends of the upper link of said pair of superimposed links being disposed on opposite sides of the vertical central longitudinal plane of said vehicle.

3. In a vehicle, the combination comprising a frame, a pair of opposite wheels having tires, two sets of wheel-suspending means one for each wheel, each set comprising a wheel carrier for one of said wheels, a pair of superimposed links extending transversely of the vehicle, each link having its outer end pivotally connected to said wheel carrier and its inner end pivotally connected to said frame, the outer end of the upper one of said links being disposed at a level at least as high as the highest point of the tire of said one of said wheels, the axial lines of said links extending through said ends in a transverse plane of said vehicle intersecting at a point disposed above a straight line extending through the place of contact of said last-mentioned one of said wheels with the ground and through the inner end of the lower one of the pair of links forming part of said set associated with the other one of said wheels, the upper links of said pair of superimposed links of both of said sets having their inner ends disposed at a common location in the vertical central longitudinal plane of said vehicle.

4. In a vehicle, the combination comprising a frame, a pair of opposite wheels having tires, two sets of wheel-suspending means one for each wheel, each set comprising a wheel carrier for one of said wheels, a pair of superimposed links extending transversely of the vehicle, each link having its outer end pivotally connected to said wheel carrier and its inner end pivotally connected to said frame, the outer end of the upper one of said links being disposed at a level at least as high as the highest point of the tire of said one of said wheels, the axial lines of said links extending through said ends in a transverse plane of said vehicle intersecting at a point disposed above a straight line extending through the place of contact of said last-mentioned one of said wheels with the ground and through the inner end of the lower one of the pair of links forming part of said set associated with the other one of said wheels, a straight line connecting the outer ends of said pair of superimposed links extending through the associated one of said tires, said wheel carrier being curved around said associated one of said tires.

5. In a vehicle, the combination comprising a frame, a pair of opposite wheels having tires, two sets of wheel-suspending means one for each wheel, each set comprising a wheel carrier for one of said wheels and a pair of superposed links each of said links having a pivotal connection with said wheel carrier and with said frame, the axial lines of said links of both said sets extending in a common transverse plane of the vehicle, said axial lines of the links of one of said sets intersecting at a point on one side of the central longitudinal plane of the vehicle and the said axial lines of the links of the other of said sets intersecting at a point on the other side of the central longitudinal plane of the vehicle, said first-named point being disposed above a line extending through the place of contact of the wheel of said one of said sets and through the said pivotal connection of the lowermost of said superposed links of said other set with said frame, and said second-named point being disposed above a line extending through the place of contact of the wheel of said other of said sets and through the said pivotal connection of the lowermost of said superposed links of said one set with said frame and helical springs disposed in substantially upright position above and braced against said lowermost links, said frame being formed with spring supports resting on the upper ends of the said springs and disposed below the upper one of said links.

6. In a vehicle, the combination comprising a frame, a pair of opposite wheels having tires, two sets of wheel-suspending means one for each wheel, each set comprising a wheel carrier for one of said wheels, a pair of superimposed links extending transversely of the vehicle, each link having its outer end pivotally connected to said wheel carrier and its inner end pivotally connected to said frame, the axial lines of said links extending through said ends in a transverse plane of said vehicle intersecting at a point disposed above a straight line extending through the place of contact of said last-mentioned one of said wheels with the ground and through the inner end of the lower one of the pair of links forming part of said set associated with the other one of said wheels, the end of the upper link of said pair of superimposed links being disposed on opposite sides of the vertical central longitudinal plane of said vehicle.

7. In a vehilcle, the combination comprising a frame, a pair of opposite wheels having tires, two sets of wheel-suspending means one for each wheel, each set comprising a wheel carrier for one of said wheels, a pair of superimposed links extending transversely of the vehicle, each link having its outer end pivotally connected to said wheel carrier and its inner end pivotally connected to said frame, the axial lines of said links extending through said ends in a transverse plane of said vehicle intersecting at a point disposed above a straight line extending through the place of contact of said last-mentioned one of said wheels with the ground and through the inner end of the lower one of the pair of links forming part of said set associated with the other one of said wheels, the upper links of said pair of superimposed links of both of said sets having their inner ends disposed at a common location in the vertical central longitudinal plane of said vehicle.

References Cited in the file of this patent

UNITED STATES PATENTS

| | | |
|---|---|---|
| 2,092,612 | Olley | Sept. 7, 1937 |
| 2,123,087 | Leighton | July 5, 1938 |
| 2,673,732 | Heston | Mar. 30, 1954 |
| 2,757,016 | Adloff | July 31, 1956 |
| 2,788,984 | Kolbe | Apr. 16, 1957 |